Sept. 24, 1968 L. E. MITCHAM 3,403,371
ADAPTER FOR CATHODE RAY TUBE TESTERS
Filed May 18, 1967

INVENTOR.
LYLE E. MITCHAM

United States Patent Office 3,403,371
Patented Sept. 24, 1968

3,403,371
ADAPTER FOR CATHODE RAY TUBE TESTERS
Lyle E. Mitcham, R.D. 2, Centerville, Pa. 16404
Filed May 18, 1967, Ser. No. 639,502
4 Claims. (Cl. 339—28)

ABSTRACT OF THE DISCLOSURE

An adapter to be used with a tester for monochrome cathode ray tubes in order to enable the tester to test tricolor cathode ray tubes. A plug end of the adapter fits the tester, and successive socket ends thereof test each color electron gun of the tube.

Summary of the invention

The adapter is provided with a first multipin plug adapted to engage the test socket of the tester (which is identical to the socket used to connect to the plugs of monochrome cathode ray tubes in normal operation) and second, third and fourth sockets, each of which is identical with the socket used to connect to the plug of tricolor tubes in normal operation.

The conventional monochrome tube tester indicates the condition of the single electron gun used in each monochrome tube.

The tricolor tube has three separate electron guns identified respectively as the red, blue and green gun.

In my invention, the first plug and the three sockets are electrically interconnected in such manner that when the plug is mounted in the tester socket and the three sockets are successively secured to then removed from the plug of a tricolor tube, the condition of each of the three guns can be determined separately and individually.

Detailed description of preferred embodiment

Figure 1:
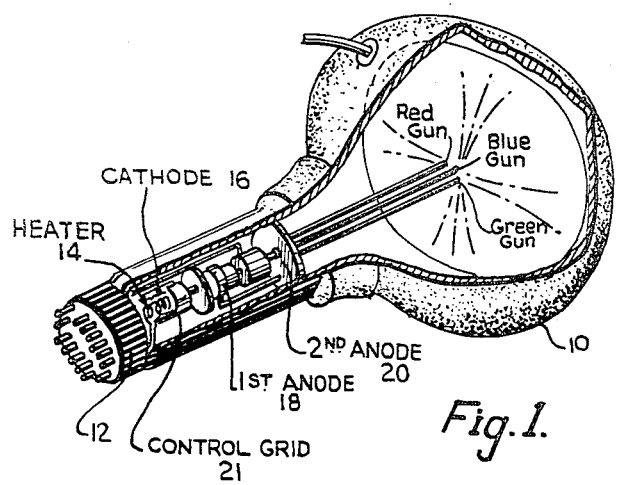
FIG. 1 is a perspective cutaway view of a tricolor cathode ray tube.
Figure 2:
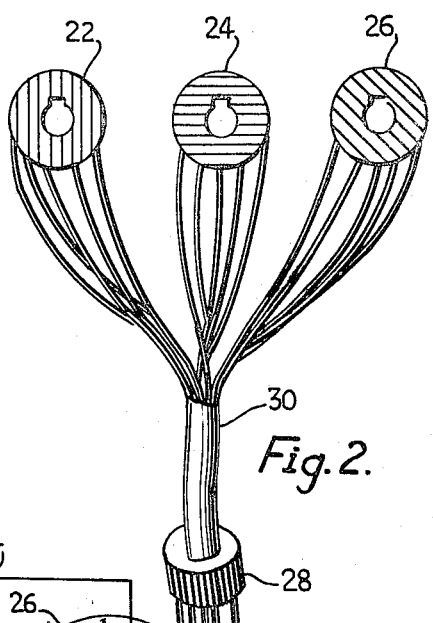
FIG. 2 is a perspective view of my adapter.
Figure 3:
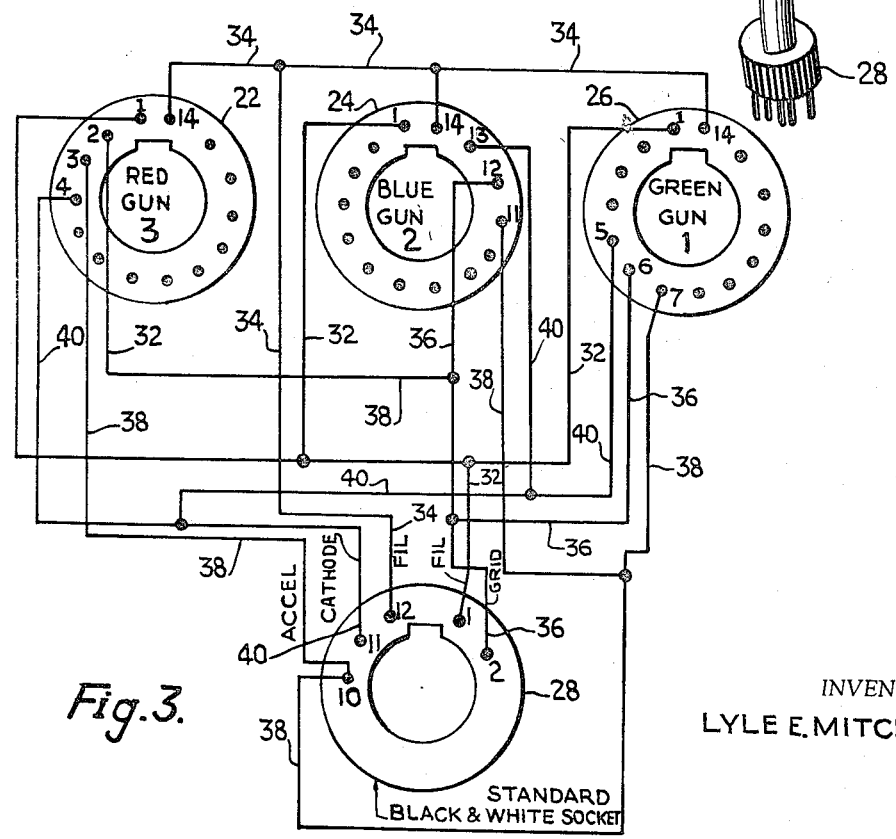
FIG. 3 is a circuit diagram of my adapter.

Referring now to FIGS. 1–3, the tricolor tube 10 has a fourteen pin end plug 12 connected to the three guns for producing red, green and blue beams, each gun having a heater (filament) 14, cathode 16, first anode 18, and high voltage second anode 20 and control grid 21.

My adapter comprises three fourteen-socket element sockets 22, 24 and 26 identified respectively as red gun, blue gun, and green gun, each socket being adapted to engage plug 12 and having elements numbered 1 through 14, respectively.

I further employ a multipin plug 28 having twelve pins numbered 1 through 12 inclusive. A cable 30 connects the plug to the sockets. In particular cable 30 is provided with a plurality of insulated leads. Lead 32 connects pin 1 of the plug to socket element 1 in each of sockets 22, 24 and 26; lead 34 connects pin 1 to elements 14 in each of these sockets; lead 36 connects pin 2 to element 2 of socket 22, element 12 of socket 24 and element 6 of socket 26; lead 38 connects pin 10 to element 3 of socket 22, element 11 of socket 24 and element 7 of socket 26; and lead 40 connects pin 11 to element 4 of socket 22, element 13 of socket 24 and element 5 of socket 26.

The adapter can then be used to test the condition of each of the three guns separately, using a conventional monochrome tester, as indicated above.

While I have described my invention with particular reference to the drawings, my protection is to be limited only by the terms of the claims which follow.

Having thus described my invention, I claim as new and desire to secure by Letters Patent:

1. An adapter adapted for detachable engagement with a monochrome cathode ray tube tester to permit said tester to test tricolor cathode ray tubes comprising:
   a first plug adapted to detachably engage the multipin socket of the tester, said tester socket being identical to that of said monochrome tube;
   second, third and fourth identical sockets, each adapted to engage the multipin plug of said tricolor tube;
   and means electrically interconnecting said plug to all of said sockets in such manner that when the first plug is connected to the socket of the tester and each of the second, third and fourth sockets is successively attached to then removed from the tricolor tube plug, the tester successively tests the red, blue and green color emissions of the tricolor tube.

2. An adapter as set forth in claim 1 wherein said tricolor tube has red, green and blue electron guns adapted to be tested by the second, third and fourth sockets respectively.

3. An adapter as set forth in claim 2 wherein the first plug has twelve separate pins numbered consecutively from one through twelve and each of the sockets has fourteen separate socket elements numbered consecutively from one through fourteen.

4. An adapter as set forth in claim 3 wherein said electrical means provides the following pin-socket element interconnection:
   (a) the fourteenth elements of the second, third and fourth sockets are connected in common to the twelfth pin of the first plug;
   (b) the first elements of the second, third and fourth sockets are connected in common to the first pin of the first plug;
   (c) the second pin of the first plug is connected to the second element of the second socket, the twelfth element of the third socket and the sixth element of the fourth socket;
   (d) the tenth pin of the first plug is connected to the third element of the second socket, the eleventh element of the third socket and the seventh element of the fourth socket; and
   (e) the eleventh pin of the first plug is connected to the fourth element of the second socket, the thirteenth element of the third socket and the fifth element of the fourth socket.

References Cited

UNITED STATES PATENTS 2,795,755   6/1957   Anthes et al. _____ 324—23 X

OTHER REFERENCES

Publication, from "Radio-Electronics" September 1959, pp. 50, 51, article by R. L. Winklepleck, title: "Test the Chassis in the Cabinet."

RICHARD E. MOORE, *Primary Examiner.*